June 21, 1955  F. S. BUTLER  2,711,261
MATERIAL HANDLING TRUCKS
Filed Feb. 11, 1953  4 Sheets-Sheet 1

INVENTOR
FRAZIER S. BUTLER
BY

June 21, 1955   F. S. BUTLER   2,711,261
MATERIAL HANDLING TRUCKS
Filed Feb. 11, 1953   4 Sheets-Sheet 2

INVENTOR
FRAZIER S. BUTLER
BY
Huskell Weatherford Jr.
atty

June 21, 1955  F. S. BUTLER  2,711,261
MATERIAL HANDLING TRUCKS
Filed Feb. 11, 1953  4 Sheets-Sheet 3

INVENTOR
FRAZIER S. BUTLER
BY
Heiskell Weatherford Jr
atty

June 21, 1955 F. S. BUTLER 2,711,261
MATERIAL HANDLING TRUCKS
Filed Feb. 11, 1953 4 Sheets-Sheet 4

INVENTOR
FRAZIER S. BUTLER

United States Patent Office 2,711,261
Patented June 21, 1955

2,711,261

MATERIAL HANDLING TRUCKS

Frazier S. Butler, Memphis, Tenn.

Application February 11, 1953, Serial No. 336,300

13 Claims. (Cl. 214—517)

This invention relates to certain new and useful improvements in hand trucks of the type adapted for material handling and generally consisting of a pair of wheels and a material supporting frame supported by the wheels for movement together with a load of material thereon.

More particularly this invention relates to a hand truck, particularly adapted for use in the unloading of vehicle bodies which incorporates means for controlling the lowering of the hand truck loaded with material from the level of the vehicle bed to the ground surface upon which the truck wheels are supported, and specifically the invention relates to a hand truck which includes a relatively movable carriage and braking means for controlling the relative movement of the carriage and truck.

The principal object of the invention is to provide a hand truck for handling material and means for controlling lowering of the truck from the level of the bed of a vehicle body to facilitate unloading of such a vehicle.

A further object of the invention is to provide such a hand truck with a movable control carriage, which carriage carries braking means mounted for controlling the rotational movement of cable-wound reels by which movement of the truck relative to the carriage may be controlled.

A further object of the invention is to provide a hand truck which is adapted to be lowered from the bed of a vehicle body and which incorporates braking means for controlling the lowering movement.

A further object of the invention is to provide a vehicle with means for supporting a hand truck for lowering from a vehicle body, which means are adjustable to modify the angularity of the truck relatively to the supporting means; and A further object of the invention is to generally improve the design, construction and efficiency of hand trucks.

The means by which the foregoing and other objects of the invention are accomplished and the manner of their accomplishment will readily be understood from the following specification upon reference to the accompanying drawings, in which.

Referring now to the drawings in which the various parts are indicated by numerals, the present invention consists of a hand truck 21 and a control carriage 23, movable relative to the hand truck, and mounted thereupon for such movement. The invention further preferably includes a special adaptation of a vehicle body for use with the hand truck and control carriage.

Hand truck 21 consists of a material supporting frame which preferably includes a pair of oppositely disposed elongated side members 25, cross members 26 and an intermediate elongated member 27, preferably disposed substantially centrally of the frame. Preferably the side members 25 are formed of structural members such as angle irons, and are disposed with one leg of the angle projecting across the front or face of the hand truck 21 and the other leg of the angle projecting rearwardly therefrom. The side members 25, cross member 26 and middle member 27 are preferably integrated together as by welding to form a unitary frame. The top of the frame is completed by a cross top member 29 which includes an upper rearwardly projecting plate 30, top member 29 being preferably formed as an angle iron with the top plate 30 forming one leg of the angle iron and projecting rearwardly from the face of the device somewhat in excess of the rearward projection of the side members 25. Top member 29 is likewise integrated to the other portions of the frame. Rigidly secured to the top of the frame, preferably also by welding, are a pair of handle members 31 which are preferably tubular and which lie within the rearwardly projecting flanges of the side members 25 and top plate 30 and are rigidly secured thereto.

Rigidly secured to the lower end of the frame and disposed preferably in perpendicular relation thereto is a toe-plate 33 which extends forwardly from the frame to provide a platform for supporting material to be handled by truck 21 and also has a relatively minor heel portion 33A projecting rearwardly from the frame and underlying instrumentalities to be described hereinafter. Toe plate 33 and its heel portion 33A are preferably secured to the bottom of the frame and preferably the frame members 25, 26 and 27 are seated on the toe plate and are secured thereto as by welding. The toe plate 33 spans from side to side of the frame and underlies the rearwardly projecting flanges of the side members 25, being cut off laterally substantially flush with the outer surfaces of these rearwardly projecting flanges. A guard plate 34 is disposed in edge abutment with toe plate 33 and is secured to the toe plate and to frame members 25, 27 in perpendicular relation to the plate. Guard plate 34 also spans from one side member 25 to the other member 25, being preferably rearward of the front legs of members 25 and in abutment with the inner surfaces of the other legs of members 25.

Secured to the side of each of the side members 25, preferably along the outer faces of the rearwardly projecting flanges thereof, are a pair of outer gussets 35 which project rearwardly from the opposite sides of hand truck 21. The lower edges of outer gussets 35 are preferably flush with the bottom face of toe plate 33. Spaced inwardly from the respective outer gussets 35 are a pair of inner gussets 37 which are disposed parallel to the outer gussets and are mounted in edge relation upon heel portion 33A of the toe plate. The forward edge of gussets 37 are secured as by welding to the rear face of guard plate 34. The outer and inner gussets 35, 37 are thus arranged in pairs adjacent the opposite sides of the rear of the hand truck. Each gusset pair, consisting of an outer gusset 35 and an inner gusset 37, supports a stub axle 39, upon which is rotatably supported a truck wheel 40, the wheels 40 being provided for facilitating movement of hand truck 21 from place to place.

Rigidly fixed to the rear face of the frame of hand truck 21 are a pair of upright guide members 41 which are preferably formed of structural members having an I-shape in cross section. One of the flanges of the I of each of the members 41 is secured in face contact with the rear of guard plate 34 and with the depending flange of upper cross member 29 and is also preferably secured to the intermediate cross members 26. The lower ends of guide members 41 are seated on and rigidly secured to heel portion 33A of the toe plate. The respective members 41 are spaced from central member 27 equidistantly and are preferably respectively disposed intermediate central member 27 and side members 25. The guide members 41 are provided to engage with control carriage 23 for relative shifting movement between truck 21 and carriage 23.

Control carriage 23 consists of a pair of outer support plates 43 and a pair of inner support plates 43 and a pair of inner support plates 45, the plates 43, 45 being vertically disposed and arranged in pairs at the opposite sides of the control carriage 23, each pair consisting of a plate 43 and a plate 45. The plates of each of the respective pairs are spaced laterally apart to permit the plates to embrace the sides of an I-member 41 (see Figs. 7 and 10), the respective plates 43, 45 lying alongside the I-members. Preferably each of the plates 45 adjacent and rearward of the guide member embracing forward portions is stepped, as at 47, to provide a seat upon which is mounted and rigidly fixed a front cross plate 49. The rear of control carriage 23 along the upper portion thereof is closed off by a rear cross plate 51 which preferably extends further downwardly along the control carriage than does the front cross plate 49, so as to house instrumentalities of the device.

Figures 1, 2, 3, 4:
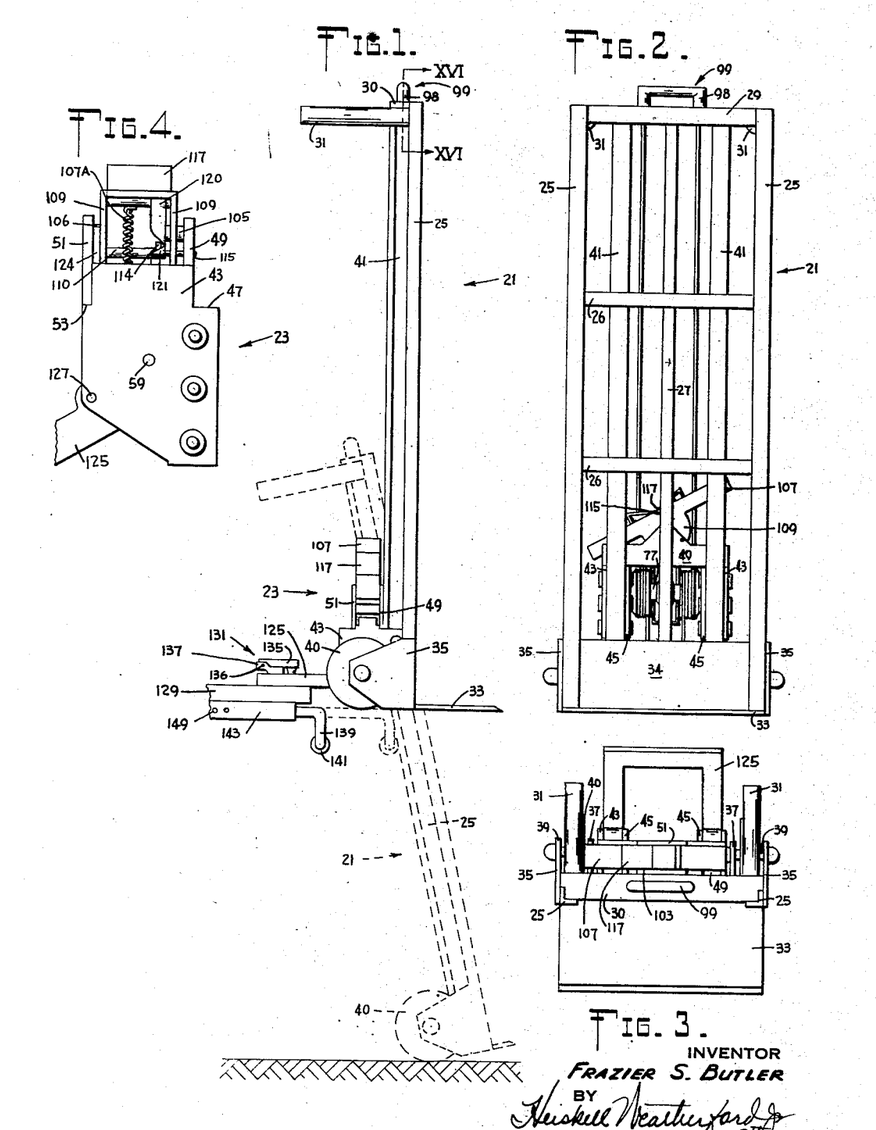
Fig. 1 is a side elevational view of the hand truck of the present invention shown in association with a portion of a vehicle body, and further showing in dotted lines a lowered position of the device and its angularity relative to the vehicle body.
Fig. 2 is a front elevational view of the device with the control carriage in position relatively to the hand truck as when preparatory to lowering of the hand truck.
Fig. 3 is a top plan view of the device.
Fig. 4 is a side elevational view of the control carriage.
Figure 6:
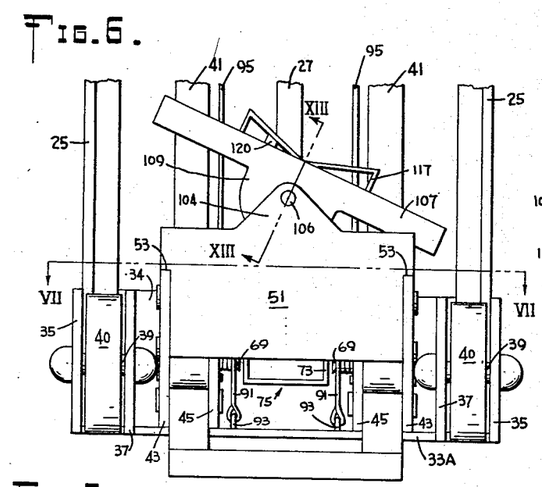
Fig. 6 is a fragmentary rear elevational view of the lower end of the device illustrating details of the construction.

Preferably front cross plate 49 is abutted against the forward edges of the respective plates 45 above the stepped portion 47 and is integrated therewith as by welding. The lower portion of rear cross plate 51 preferably abuts the inner surfaces of outer plates 43 and the rear edges of inner plates 45 and is secured thereto preferably as by welding. The upper portion of rear cross plate 51 is also preferably laterally extended as at 53 to seat upon suitable seats formed on the outer support plates 43, (see Figs. 4 and 6).

Forwardly the outer support plates 43 respectively support a plurality of vertically arranged rollers 55 which are positioned and are adapted to ride in the channel formed along one side of an I-guide member 41. Rollers 55 are rotatably carried by the outer cross plates 43 and lie adjacent the inner surface of the outer cross plates. Similarly the inner plates 45 are each provided with a plurality of similar rollers 57 which are positioned and arranged to engage and move in the channel on the opposite side of an I-guide member 41, rollers 57 being similarly supported by inner plates 45 adjacent the outer surfaces thereof.

Rearwardly of the rollers 55 and below the level of front cross plate 49 a shaft 59 is mounted in and supported by the opposite outer plates 43. Rotatably mounted upon the shaft 59 respectively adjacent the opposite outer plates 43 are wheels 61 which are of a size to ride upon the rearward flange of the I guide members 41, the wheels 61 being respectively provided with outer flange portions to engage against the outer edges of the I members 41. Inner plates 45 are suitably apertured to rotatably receive the peripheral surface of wheels 61 and the apertures of plates 45 are preferably provided with bearing surfaces 63 to provide for the free rotation of wheels 61 relatively to the plates 45.

Figure 8:
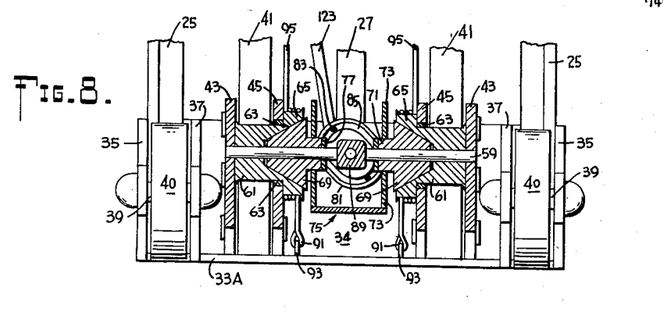
Figs. 8 and 9 are sectional views taken as on the line VIII—VIII of Fig. 7, and respectively showing operative positions of parts of the control carriage of the invention in use.

Inwardly of plates 45 each of the wheels 61 is provided with an integral sheave 65 of a diameter somewhat enlarged relative to the wheel diameter, which are adapted to receive and have wound thereupon suitable cables in the manner hereinafter set forth. Each of the combination wheels 61, including sheave 65, is provided with a substantially conical recess 67 which preferably extends from the inner edge of the sheave portions 65 laterally outwardly beyond the inner plates 45 (see Figs. 8, 9 and 10). Slidably mounted on transverse shaft 59 and projecting loosely into the conical recesses 67 are a pair of oppositely disposed brake cones 69, the brake cones 69 being of a size and shape to register and mate with the conical recesses 67 when projected fully thereinto. Each of the brake cones 69 is provided with an inwardly projecting angular neck portion 71 which are preferably formed of rectangular cross section and slidably project inwardly through a suitable, similarly shaped aperture formed in an upstanding wall 73 of a box 75 housed within the control carriage, the box 75 preferably being provided with an open top. It thus will be seen that the brake cones 69 are locked against rotation relatively to shaft 59 by the interengagement of the angular necks 71 with the apertures of box walls 73.

Within the box 75 each of the necks 71 is preferably provided with a retractor member 77, which, in the preferred embodiment consists of rectangular plates, preferably disposed with the major dimension extending longitudinally, that is fore and aft of the control carriage, and are rigidly fixed to the necks 71. The forward and rearward edges of retractor members 77 respectively lie inwardly of peripheral flanges 78, 79 of cam plates 81, 82. Preferably cam plates 81, 82 and flanges 78, 79 are formed of substantially elliptical shape. The cam members 81, 82 are preferably joined together for concurrent movement by upper and lower rods 83, and each of the cam members 81, 82 is provided with a groove 85, the grooves 85 being encompassed by the respective flanges 78, 79 and slidably embracing the forward and rearward ends of retractor members 77.

The cam plates 81, 82 are respectively rotatably mounted upon stub shafts 87 projecting forwardly and rearwardly from a block 89, the block 89 being non-rotatably mounted upon shaft 59 with the stub shafts 87 projecting substantially at right angles to the shaft 59. It will be seen, as best shown by a comparison of Fig. 8 and Fig. 9, that upon suitable rotation of the cam members 81, 82 the brake cones 69 are thrust into the conical recesses 67 (Fig. 8) and effect braking of wheels 69 and sheaves 65, and upon reverse rotation the cones are withdrawn from the recesses (Fig. 9) by the interaction of members 77 and cam plates 81, 82.

Figure 16:
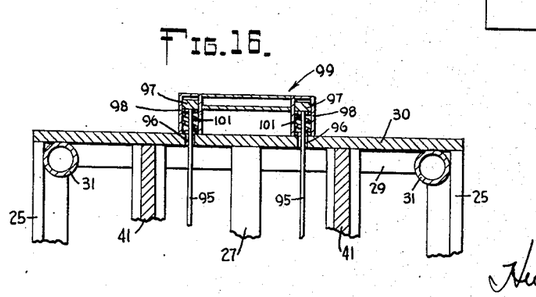
Fig. 16 is a fragmentary sectional view taken as on the line XVI—XVI of Fig. 1.

Secured to each of the sheaves 65 are the upper ends of downwardly extending cables 91, the lower ends of cables 91 being respectively secured to the heel portion 33A of the toe plate 33 as by suitable connections 93. Similarly secured to each of the sheaves 65 are the lower ends of upwardly extending cables 95, the upper ends of the cables 95 being passed through suitable apertures 96 in top plate 30 and each of the upper ends of cables 95 having a head 97 secured thereto, the heads 97 being slidably mounted in the hollow interior of tubular uprights 98 forming part of a substantially U-shaped handle portion 99 (see Fig. 16). Preferably compression springs 101 are respectively interposed within uprights 98 between heads 97 and the upper surface of top plate 30 so as to urge the heads 97 and the upper ends of cables 95 upwardly within the U-shaped handle 99 and to further provide a resilient connection for the upper ends of the cables 95.

In order to provide for the rotation of cam members 81, 82 a suitable leverage pedal assembly is also provided in the present invention. For the purpose of rockably supporting the pedal leverage assembly, the front and rear cross plates 49, 51 are provided with upwardly projecting, substantially triangular portions 103, 104, in which portions are suitably supported a fore and aft disposed stub shaft 105, 106. Rockably mounted on shafts 105, 106 is a transversely extending pedal member 107 which is preferably formed as a substantially channel-shaped member, from the flanges of which are respectively depended a pair of substantially semi-circular ear portions 109, the ear portions 109 preferably providing the journals for the rocking movement of pedal 107 on shafts 105, 106.

Extending between and rigidly secured to the semicircular ear portions 109 is a tubular cylindrical member 110 which is preferably slotted along its upper edge and houses a compression spring 111. Spring 111 bears against one end of a pin 113 mounted in the tubular housing 110, the pin 113 having an upstanding lug 114 projecting upwardly through the slot formed in the cylindrical housing 110. The opposite end of the pin projects through an aperture formed in one of the semi-circular ear portions 109, preferably in the forward of the ear portions, and extends therethrough into a suitable aperture 115 formed in one of the control carriage cross plates, preferably the front cross plate 49. It is apparent that with the pin 113 extending into aperture 115 the pedal member 107 is locked against rocking movement relative to the cross plates 49, 51.

Preferably pedal member 107 is provided with a supplemental pedal 117 for releasing the latching engagement between pin 113 and aperture 115. Supplemental pedal 117 consists of a pair of oppositely upwardly diverging leaves, pivoted as at 118, to pedal member 107, the lower surface of one of the leaves of pedal 117 being secured to and bearing against the upper end of one of a pair of wedge-shaped cam members 120, 121, the cams being supported from a plate 122 pivoted upon the pedal shaft 105. The feather edges of the wedge-shaped members 120, 121 are positioned to lie behind the upstanding lug 114 of pin 113. It is apparent that as supplemental pedal 117 is depressed in either direction about pivot 118, plate 122 is swung about shaft 105, respectively shifting the wedge-shaped members under shift of supplemental pedal 117, the action of the wedge swinging about pedal 105 being effective to retract lug 114 and its pin 113 against the action of spring 111, removing the pin from engagement with latch hole 115 and freeing the pedal member 107 for rocking movement relatively to the cross plates 49, 51.

Pedal member 107 is connected to elliptic cam members 81, 82 by suitable links 123, 124 so that upon opposite rocking movement of pedal member 107 motion is transmitted to the interconnected cam members 81, 82 to effect rotation of the cam members.

It is further preferred that the control pedal 107 be provided with means urging the pedal to remain in cam rotated position, and for that purpose a tension spring 107A is provided, spring 107A is anchored at its upper end as at 107B to the pedal 107 at a point substantially on the transverse midline of pedal 107 and above the pedal pivot shafts 105, 106. The opposite or lower end of spring 107 is connected to a cross member 107C disposed substantially on the transverse midline of cross plates 49, 51, and preferably extending therebetween, below the pedal pivots 105, 106. It is further apparent that spring 107A is positioned to shift between the proximate ends of pivots 105, 106. As is obvious when pedal 107 is positioned exactly horizontal, spring 107A is extended vertically across the pivot axis of the pedal and the spring is ineffective to urge shift or movement of the pedal. However, immediately upon rocking pedal 107 in either direction the spring is shifted off center from the pivot axis and is immediately effective to urge continued shift of the pedal to rocked position and further to resist return movement of the pedal toward horizontal position. Thus it will be seen that spring 107A is effective upon minor shift of the pedal 107 to urge the pedal to move to cam rotated position in which the brake cones 69 are in braking position engaging recesses 67, and to yieldingly retain the cones in such braking position for control of the control carriage.

Preferably the control carriage 23 is additionally provided with a substantially U-shaped retaining bracket 125, the legs of the U being hingedly connected as at 127 to the control carriage. The connection at 127 is preferably provided by suitable hinge pins connected to the respective support plates 43, 45 adjacent the lower edges thereof.

Figure 11:
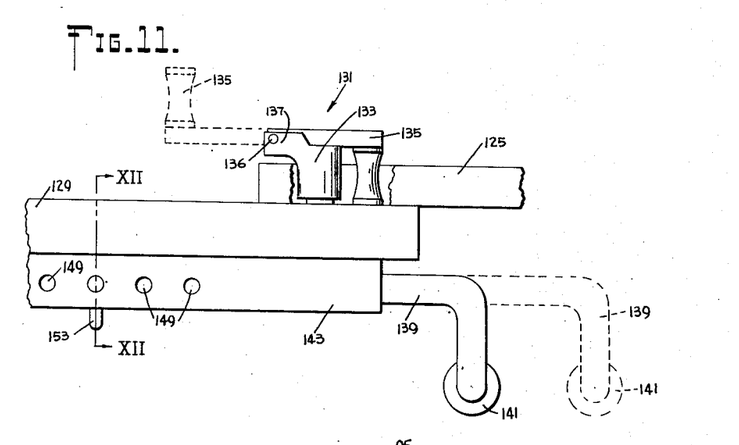
Fig. 11 is a fragmentary side elevational view on an enlarged scale of the rear end of a vehicle body as a tail gate thereof, illustrating details of the arrangement therein.
Figure 12:
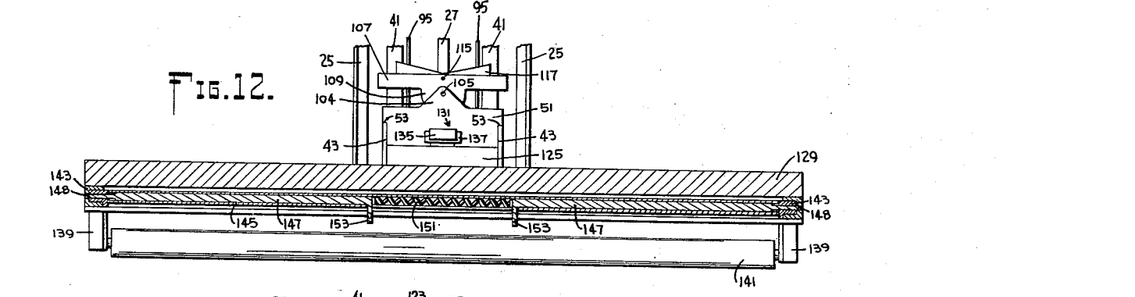
Fig. 12 is a cross sectional view taken as on the line XII—XII of Fig. 11.

In addition it is preferred that the device of the present invention be employed with a suitable modification of a vehicle body, best illustrated in Figs. 11 and 12. In this embodiment as illustrated, the bed of the vehicle body 129 is provided with a special abutment 131, preferably consisting of an upstanding pin secured to the bed 129, upon which is rotatably mounted a sleeve member 133. A handle 135 of crank-like embodiment is hingedly attached as at 136 to sleeve 133, the connection at 136 being offset from the sleeve 133 to provide an overhanging portion 137 which is spaced above the vehicle bed 129.

Preferably the vehicle body beneath bed 129 is provided with means for angular adjustment consisting of a pair of L-shaped brackets 139, the short leg of the L-shaped brackets extending downwardly and having an elongated roller 141 supported therebetween. The longer or major legs of the L-shaped brackets 139 extend slidably within channel-like trackways 143 which are rigidly secured to and supported from the underside of the vehicle bed 129. Connected to and extending between the major legs of the brackets 139 is an elongated tubular member 145 which is provided with a pair of oppositely extending plungers 147, the ends of the plungers being thinned to form pin portions 148. Each of the pin portions 148 extends through a closely fitting opening formed in the major leg of the L brackets 139 (see Fig. 12) and is adapted to project beyond the brackets 139 into engagement with the inner face of the tracks 143. Preferably the tracks 143 are each provided with a plurality of latch apertures 149, which, when in register with the pin portions 148, are adapted to receive the pin portions and be engaged thereby to latch the bracket members 139 against movement relative to the trackways.

A compression spring 151 is disposed in tube 145 between the plungers 147 and urges the plungers outwardly toward latching position. Each of the plungers is provided with a downwardly extending lug portion 153 which extend through a suitable slot formed in the bottom portion of the tube 145 and are preferably provided for retracting the plungers out of latching position against the action of springs 151 for shifting movement.

In the assembly of the device the hand truck is assembled substantially as described, preferably with the top member 29 being left unattached. Similarly the control carriage 23 is assembled in the manner described and is then mounted upon the I guide members 41 with the rollers 55, 57 being alined in the opposite channels of the members 41. It will be seen that the surface of wheels 61 then ride upon the rearward flange of the guide members 41. With the carriage thus mounted upon the guide members downwardly extending cables 91 may be secured as at 93 to the bottom plate of the hand truck and upwardly extending cables 95 may be secured to heads 97, the heads positioned in the U-shaped top handle 99, with the cables passing through the apertures 96. The handle 99 may then be secured in position on top cross member 29 and the cross member 29 integrated with the remaining portions of the frame of the hand truck.

It thus will be seen that the control carriage 23 is capable of relative movement along the guide members 41 with the rollers 55, 57 travelling in the channels of the guide members. As the control carriage moves relatively to the guide members and with the wheels 61 travelling upon the rear face of the guide members, wheels 61 are rotated upon shaft 59, rotating the sheave portions 65 which are integral with the wheels. As the sheaves 65 are thus rotated the cables are respectively paid out from the sheave portions and the opposite cables wound thereupon. As the respective cables are secured to the opposite upper and lower ends of the hand truck it will readily be seen that by controlling the rotation of the sheaves 65 the relative movement of the control carriage and the hand truck may likewise be controlled.

Figure 9:
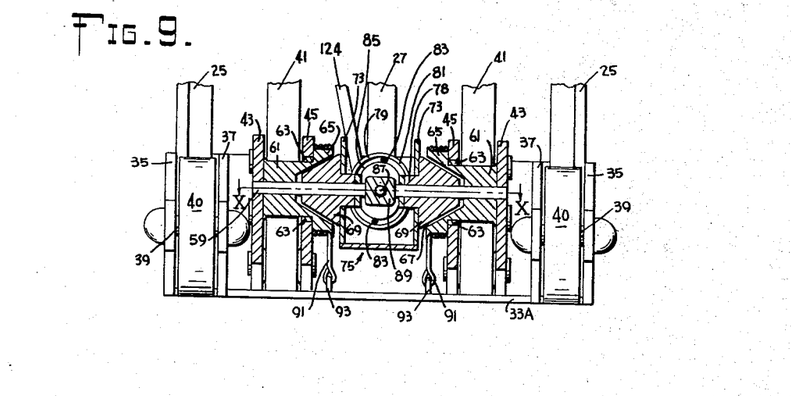
Figure 10:
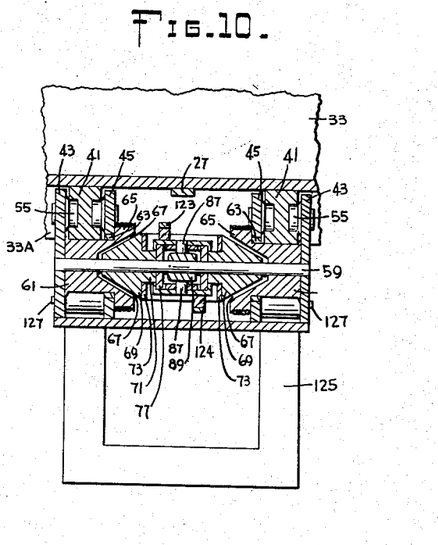
Fig. 10 is a fragmentary sectional plan view taken as on the line X—X of Fig. 9.

Thus it will be seen that in the absence of control of the rotation of the sheaves, fixing or attachment of the control carriage in a relatively fixed position will permit the hand truck 21 to be shifted vertically relatively thereto and conversely fixing the hand truck 21 in a relatively fixed position will permit the relative shift of the control carriage 23 relative to the hand truck It will be observed that the braking means, consisting of the pedal assembly described and the connection to the rotatable cam plates 81, 82 is effective to act upon the brake cones 69 so as to limit the rotation of wheels 61 and sheaves 65. Thus when the brake pedal 107 is in the position as shown in Figs. 9 and 10, when the brake pedal 107 is depressed about pivots 105, 106 in either direction, as to the position shown in Fig. 6, the cam plates 81, 82 are rotated by the connection to the brake pedal to the position shown in Fig. 8, in which condition the elliptical grooves 85 in the cam plates 81, 82 act upon the retractor members 77 to force the members outwardly to the position shown in Fig. 8, the movement of the retractor members similarly moving the brake cones 69 to shift along the shaft 59 upon which the cone members are shiftably and slidably supported. When the brake cones 69 are shifted outwardly they are moved and held in positive frictional engagement with the conical recesses 67 and retard rotational movement of wheel 61 and cable sheaves 65. With the sheaves thus held against rotation the position of the control carriage relative to the hand truck is maintained by the oppositely extending cables 91, 95.

Figure 5:
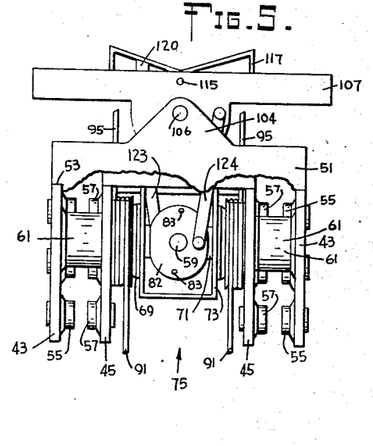
Fig. 5 is a rear elevational view of the control carriage with certain parts broken away for purposes of illustration.
Figures 7, 14, 15:
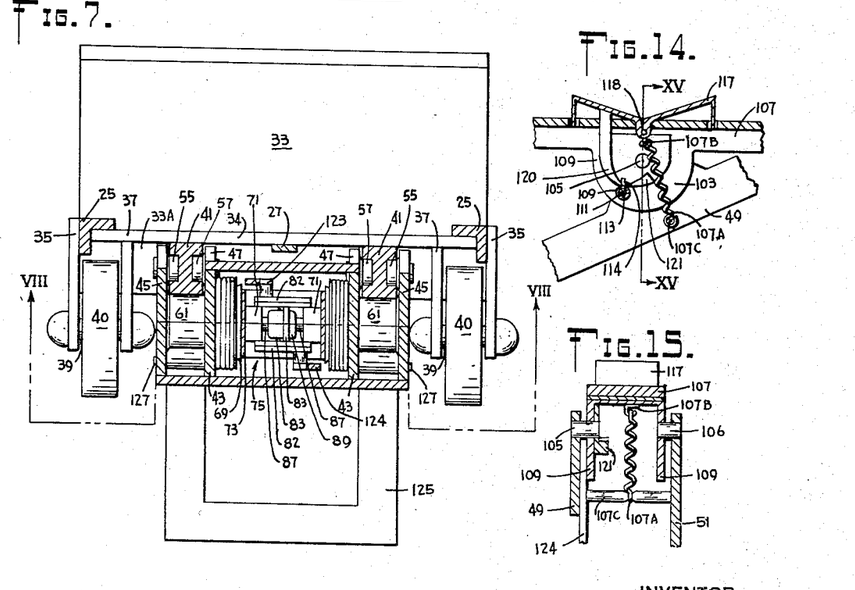
Fig. 7 is a sectional plan view taken as on the line VII—VII of Fig. 6.
Fig. 14 is a fragmentary sectional view taken as on the XIV—XIV of Fig. 13.
Fig. 15 is a fragmentary sectional view taken as on the line XV—XV of Fig. 14.
Figure 13:
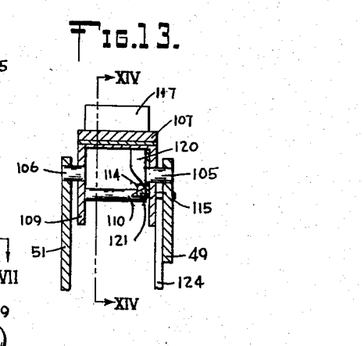
Fig. 13 is a fragmentary sectional view taken as on the line XIII—XIII of Fig. 6.

It will be seen, as already pointed out, that with the brake cones shifted into the outward braking position, by movement of the pedal 107, the spring 107A is effective to retain the pedal in such braking position, such retention being yielding so that the device may be released for relative movement between the control carriage and the hand truck. It will further be seen that when the pedal device is moved to the position shown in Fig. 5 the latching arrangement, best illustrated in Figs. 13, 14 and 15, is then effective to latch the pedal in such horizontal, non-braking position.

In the use of the device, particularly in conjunction with the preferred modification of the vehicle bed, the abutment means mounted upon the vehicle are arranged preferably in the manner as shown in Fig. 11, in which the sleeve 133 is positioned with the overhanging portion 137 projecting away from the end of the vehicle bed, and with the handle 135 folded over about its hinged connection 136 so as to project toward the end of the vehicle bed.

With the abutment device thus positioned the angularity determining means, consisting of the L-shaped brackets 139 and roller 141, may then be shifted outwardly as to the position shown in dotted lines in Fig. 11. In so doing the plungers 147 are retracted through the use of lugs 153 against the action of spring 151, removing the pins 148 from engagement with latch apertures 149. The device may then be shifted outwardly, as stated, as to the position shown in dotted lines, in which the roller 141 carried by the brackets 139 is projected substantially beyond the end of the vehicle bed. With the device thus positioned the plungers 147 may be released and spring 151 will again be effective to move the pin portions 148 outwardly to resume engagement with another of the latch apertures 149, thus locking the angularity adjustment means in adjusted position.

With the device thus arranged unloading of the vehicle bed may be accomplished through the use of the hand truck 21. With the brake cones set in braking position by depression of pedal 107 to one of the opposite positions of angularity, such as that shown in Fig. 6, and with the control carriage positioned adjacent the toe plate 33, shown as for example in Fig. 2, the retainer bracket 125 may be swung downwardly about its hinge connections 127 to a position, such as is shown in Fig. 10 and in Fig. 1. With the retainer bracket in such position it rests easily upon the vehicle bed and trails behind the hand truck as the same is moved upon the truck wheels 40. With the device thus arranged merchandise or other material to be handled upon the hand truck may be stacked upon the toe plate 33 and the truck ready for movement. When the truck has been loaded as desired in the unloading operation the truck is moved rearwardly toward the free end of the truck bed with the trailing bracket 125 following behind such movement. As the trailing bracket passes over the abutment 131 the cross portion of the retainer bracket 125 engaged against the sleeve 133 and beneath the overhanging offset portion 137, as fragmentarily shown in Fig. 11, and thus serves to engage the hand truck with the vehicle body in a position in which the hand truck extends beyond the free end of the vehicle body and with the control carriage 23 overlying and seated upon the rear end of the vehicle body.

With the device thus arranged the locking of the brake cones 69 in the recesses 67, preventing rotation of the sheaves 65, maintains the hand truck in its relative position. The truck may then be tilted to pass over the extended angularity adjustment means of the roller 141 to a position, such as is shown in dotted lines in Fig. 1. With the device thus positioned the operator may then step upon the raised portion of pedal 107 against the action of spring 107A so as to release the braking engagement between the cones 69 and recesses 67, thus permitting the sheaves to rotate and to allow the hand truck to move downwardly relative to the control carriage. When the hand truck has moved downwardly to ground level the device may simply be unhooked from the abutment means, preferably the crank handle 135 may be swung about its pivot connection 136 to the position shown in dotted lines in Fig. 11, and the sleeve 133 may then be rotated until the then extended handle 135 is projecting toward the rear end of the vehicle. It thus will be seen that the offset portion 137 will be removed from overlying of the cross portion of the bracket 125 and the bracket may then be simply swung up about its hinge connections to release the engagement between the control carriage and the hand truck. The hand truck may then be wheeled away from the vehicle and the materials unloaded therefrom as desired.

When the device has thus been released from the vehicle the action of spring 107A will be effective to maintain the control carriage pedal in braking position so as to retain the hand truck in upper position relative to the hand truck. When suitable or convenient the control carriage may be lowered through release of the brake to a position relative to the hand truck, such as is shown in Fig. 2, and the device is again ready for additional use in the unloading of vehicles in the manner described.

I claim:

1. In a material handling hand truck; a frame, a pair of upright guide members secured to said frame, said guide members being substantially of I-shape in cross section and each having a flange engaging said frame, a second flange spaced from the first mentioned flange and a pair of elongated oppositely facing channels between said flanges; and a control carriage mounted on said guide members, said control carriage having a plurality of rollers engaging each of said guide member channels to support said carriage for movement relative to said frame, a pair of flanged wheels carried by said carriage and respectively engaging said guide member second flanges, and braking means associated with said flanged wheels whereby to control movement of said carriage relative to said guide members and frame.

2. In a material handling hand truck; a truck frame comprising upright side members, a pair of upright guide members secured to said frame intermediate said side members, said guide members being substantially of I-shape in cross section and each having a flange engaging said frame, a second flange spaced from the first mentioned flange and a pair of elongated oppositely facing channels between said flanges; and a control carriage mounted on said guide members, said control carriage having a plurality of rollers engaging each of said guide member channels to support said carriage for movement relative to said frame, a pair of flanged wheels carried by said carriage and respectively engaging said guide member second flanges, and braking means associated with said flanged wheels whereby to control movement of said carriage relative to said guide members and frame.

3. In a material handling hand truck; a truck frame, upright guide members secured to said frame, a control carriage mounted on said guide members, said control carriage having means engaging each said guide member to support said carriage for movement relative to said frame, a pair of wheels rotatably carried by said carriage respectively engaging said guide members spaced from said supporting engagement, each said wheel having an integral sheave portion, cable means wound on and secured to said sheave portions and respectively connected to opposite ends of said frame, each said wheel and sheave having a conical recess, a pair of brake cones slidably supported on said carriage, said cones being of a size complementary to the size of said recesses and being positioned loosely in said recesses, means restraining said cones against rotation, and means for shifting said cones tightly into said recesses to lock said wheels and sheaves against rotation.

4. In a material handling hand truck; a truck frame, upright guide members secured to said frame, a control carriage mounted on said guide members, said control carriage having means engaging each said guide member to support said carriage for movement relative to said frame, a shaft extending transversely of said carriage, a pair of flanged wheels respectively engaging said guide members spaced from said supporting engagement, said wheels being rotatable on said shaft, each said wheel having an integral sheave portion, cable means wound on and secured to said sheave portions and respectively connected to opposite ends of said frame, each said wheel and sheave having a conical recess, a pair of brake cones slidably mounted on said shaft, said cones being of a size complementary to the size of said recesses and being positioned loosely in said recesses, means restraining said cones against rotation, and means for shifting said cones tightly into said recesses to lock said wheels and sheaves against rotation.

5. In a material handling hand truck; a truck frame, a pair of upright guide members secured to said frame, a control carriage mounted on said guide members, said control carriage having means engaging each said guide members to support said carriage for movement relative to said frame, a shaft extending transversely of said carriage, a pair of flanged wheels respectively engaging said guide members spaced from said supporting engagement, said wheels being rotatable on said shaft, each said wheel having an integral sheave portion, cable means wound on and secured to said sheave portions and respectively connected to opposite ends of said frame, each said wheel and sheave having a conical recess, a pair of brake cones slidably mounted on said shaft, said cones being of a size complementary to the size of said recesses and being positioned loosely in said recesses, means restraining said cones against rotation, and means for shifting said cones tightly into said recesses to lock said wheels and sheaves against rotation, said cone shifting means comprising elliptical cam means engaging said cones remote from said recesses, said cam means being rotatably supported, a rockable pedal supported by said control carriage above said cams, and linkage connecting said pedal to said cams for transmitting pedal rocking to said cams upon movement of said pedal toward rocked position to effect cam rotation and shift of said plates and cones.

6. In a material handling hand truck; a truck frame, upright guide members secured to said frame, a control carriage mounted on said guide members, said control carriage having means engaging opposite sides of portions of each said guide member to support said carriage for movement relative to said frame, an integral sheave portion carried by part of said guide-member-engaging means, cable means wound on and secured to said sheave portions and respectively connected to opposite ends of said frame, each said sheave having a conical recess, a pair of brake cones slidably mounted on said carriage, said cones being of a size complementary to the size of said recesses and being positioned loosely in said recesses, means restraining said cones against rotation, and means for shifting said cones tightly into said recesses to lock said sheaves against rotation, said cone shifting means comprising elliptical cam means engaging said cones remote from said recesses, said cam means being rotatably supported, a rockable pedal supported by said control carriage above said cams, and linkage connecting said pedal to said cams for transmitting pedal rocking to said cams upon movement of said pedal toward rocked position to effect cam rotation and shift of said plates and cones.

7. In a material handling hand truck; a truck frame, a pair of upright guide members secured to said frame, and a control carriage mounted on said guide members, said control carriage having a plurality of rollers engaging each said guide members to support said carriage for movement relative to said frame, a pair of flanged wheels carried by said carriage and respectively engaging said guide members in spaced relation to said rollers, a portion of said guide members being disposed between said rollers and said wheels, and braking means associated with said flanged wheels whereby to control movement of said carriage relative to said guide members and frame.

8. In a material handling hand truck; a truck frame, a pair of upright guide members secured to said frame, and a control carriage mounted on said guide members, said control carriage having a plurality of rollers engaging each of said guide members to support said carriage for movement relative to said frame, a pair of wheels carried by said carriage and respectively engaging said guide members in spaced relation to said rollers, a portion of said guide members being disposed between said rollers and said wheels, and braking means associated with said wheels whereby to control movement of said carriage relative to said guide members and frame.

9. In a material handling truck; a truck frame comprising upright side members, a transverse top member secured to the upper ends of said side members, a toe plate secured to the lower ends of said side members, a pair of upright guide members secured to said frame intermediate said side members, said guide members being substantially of I-shape in cross section and each having a flange engaging said frame, a second flange spaced from the first mentioned flanges and a pair of elongated oppositely facing channels between said flanges; and a control carriage mounted on said guide members, said control carriage having a plurality of rollers engaging each of said guide member channels to support said carriage for movement relative to said frame, a shaft extending transversely of said carriage, a pair of flanged wheels respectively engaging said guide members second flanges, said wheels being rotatable on said shaft, each said wheel having an integral sheave portion, cable means wound on and secured to said sheave portions and respectively connected to said top member and to said toe plate, each said wheel and sheave having a conical recess, a pair of brake cones slidably mounted on said shaft, said cones being of a size complementary to the size of said recesses and being positioned loosely in said recesses, means restraining said cones against rotation, and means for shifting said cones tightly into said recesses to lock said wheels and sheaves against rotation, said cone shifting means comprising plates secured to said cones remote from said recesses, elliptical cam means engaging said plates, said cam means being rotatably supported, a rockable pedal supported by said control carriage above said cams, linkage connecting said pedal to said cams for transmitting pedal rocking to said cams upon movement of said pedal toward rocked position to effect cam rotation and shift of said plates and cones, and spring means yieldingly restraining return movement of said pedal from rocked position.

10. In a material handling truck; a truck frame comprising upright side members, a transverse top member secured to the upper ends of said side members, a toe plate secured to the lower ends of said side members, a pair of upright guide members secured to said frame intermediate said side members, said guide members being substantially of I-shape in cross section and each having a flange engaging said frame, a second flange spaced from the first mentioned flanges and a pair of elongated oppositely facing channels between said flanges; and a control carriage mounted on said guide members, said control carriage having a plurality of rollers engaging each of said guide member channels to support said carriage for movement relative to said frame, a shaft extending transversely of said carriage, a pair of flanged wheels respectively engaging said guide member second flanges, said wheels being rotatable on said shaft, each said wheel having an integral sheave portion, cable means wound on and secured to said sheave portions and respectively connected to said top member and to said toe plate, each said wheel and sheave having a conical recess, a pair of brake cones slidably mounted on said shaft, said cones being of a size complementary to the size of said recesses and being positioned loosely in said recesses, and means restraining said cones against rotation, and means for shifting said cones tightly into said recesses to lock said wheels and sheaves against rotation, said cone shifting means comprising plates secured to said cones remote from said recesses, elliptical cam means engaging said plates, said cam means being rotatably supported, a rockable pedal supported by said control carriage above said cams, linkage connecting said pedal to said cams for transmitting pedal rocking to said cams upon movement of said pedal toward rocked position to effect cam rotation and shift of said plates and cones.

11. In a material handling truck; a truck frame comprising upright side members, a transverse top member secured to the upper ends of said side members, a toe plate secured to the lower ends of said side members, a pair of upright guide members secured to said frame intermediate said side members, said guide members being substantially of I-shape in cross section and each having a flange engaging said frame, a second flange spaced from the first mentioned flanges and a pair of elongated oppositely facing channels between said flanges; and a control carriage mounted on said guide members, said control carriage having a plurality of rollers engaging each of said guide member channels to support said carriage for movement relative to said frame, a shaft extending transversely of said carriage, a pair of flanged wheels respectively engaging said guide member second flanges, said wheels being rotatable on said shaft, each said wheel having an integral sheave portion, cable means wound on and secured to said sheave portions and respectively connected to said top member and to said toe plate, each said wheel and sheave having a conical recess, a pair of brake cones slidably mounted on said shaft, said cones being of a size complementary to the size of said recesses and being positioned loosely in said recesses, means restraining said cones against rotation, and means for shifting said cones tightly into said recesses to lock said wheels and sheaves against rotation, said cone shifting means comprising elliptical cam means engaging said cones remote from said recesses, said cam means being rotatably supported, a rockable pedal supported by said control carriage above said cams, and linkage connecting said pedal to said cams for transmitting pedal rocking to said cams upon movement of said pedal toward rocked position to effect cam rotation and shift of said plates and cones.

12. In combination a material handling truck comprising a truck frame, a control carriage shiftably mounted on said frame for movement to and from the lower end of said frame, said control carriage including a substantially U-shaped bracket hingedly connected to said carriage, and a vehicle body having an abutment sleeve mounted thereon and projecting therefrom, said sleeve being positioned in the path of said U-bracket along said body when said carriage is positioned adjacent the lower end of said frame and said truck is moved along said body to engage said bracket and limit movement of said truck, said sleeve including an offset portion spaced above said body and overlying said bracket to limit upward movement of said bracket when engaged against said sleeve, said sleeve being rotatable to remove said offset portion and free said bracket for upward movement, and a handle pivoted to said offset portion for effecting sleeve rotation.

13. In combination a material handling truck comprising a truck frame, a control carriage shiftably mounted on said frame for movement to and from the lower end of said frame, said control carriage including a substantially U-shaped bracket hingedly connected to said carriage, and a vehicle body having an abutment sleeve mounted thereon and projecting therefrom, said sleeve being positioned in the path of said U-bracket along said body when said carriage is positioned adjacent the lower end of said frame and said truck is moved along said body to engage said bracket and limit movement of said truck, said sleeve including an offset portion spaced above said body and overlying said bracket to limit upward movement of said bracket when engaged against said sleeve, said sleeve being rotatable to remove said offset portion and free said bracket for upward movement.

(References on following page)

References Cited in the file of this patent

UNITED STATES PATENTS

| Number | Name | Date |
|---|---|---|
| 1,006,781 | Owen | Oct. 24, 1911 |
| 1,429,004 | Wick | Sept. 12, 1922 |
| 1,541,529 | Saylor | June 9, 1925 |
| 1,604,060 | Matthews | Oct. 19, 1926 |
| 1,780,064 | Buzzo | Oct. 28, 1930 |
| 1,956,650 | Milner | May 1, 1934 |
| 2,105,210 | Berg | Jan. 11, 1938 |
| 2,169,661 | Ratcliffe | Aug. 15, 1939 |
| 2,354,337 | Smith | July 25, 1944 |
| 2,598,489 | Bayer et al. | May 27, 1952 |
| 2,606,678 | Penberthy et al. | Aug. 12, 1952 |

FOREIGN PATENTS

| Number | Country | Date |
|---|---|---|
| 587,296 | Great Britain | Apr. 21, 1947 |